Aug. 4, 1925
M. KRECHAFSKY
BRACE FOR AUTOMOBILE RADIATORS
Filed July 30, 1920
1,548,532
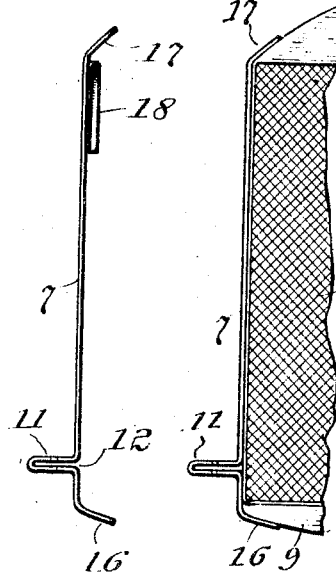
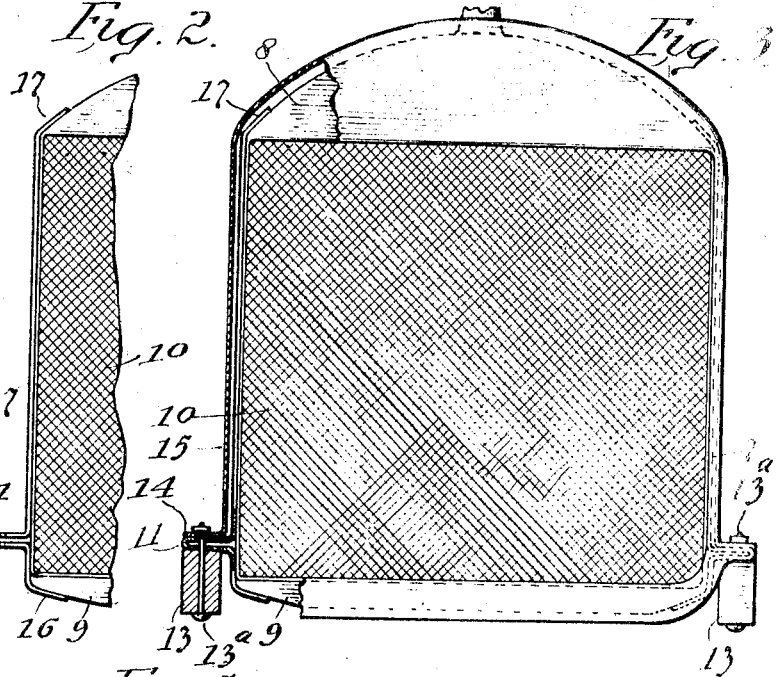
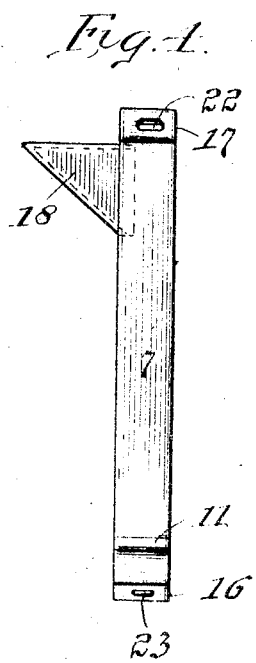
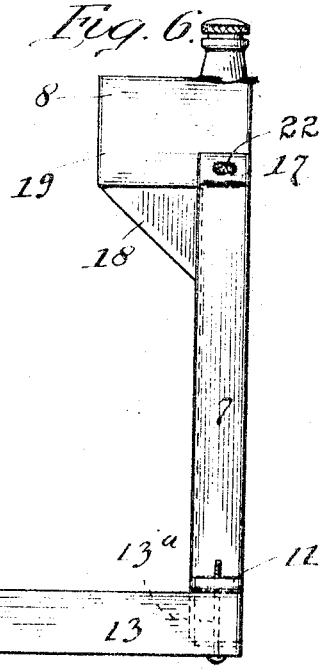

Patented Aug. 4, 1925.

1,548,532

UNITED STATES PATENT OFFICE.

MAX KRECHAFSKY, OF CHICAGO, ILLINOIS, ASSIGNOR TO AUTO RADIATOR MANUFACTURING COMPANY, OF CHICAGO, ILLINOIS, A CORPORATION OF ILLINOIS.

BRACE FOR AUTOMOBILE RADIATORS.

Application filed July 30, 1920. Serial No. 400,252.

*To all whom it may concern:*

Be it known that I, MAX KRECHAFSKY, a citizen of the United States, and a resident of the city of Chicago, in the county of Cook and State of Illinois, have invented certain new and useful Improvements in Braces for Automobile Radiators, of which the following is a full, clear, and exact specification.

This invention relates to improvements in automobile radiator braces connecting the top and bottom tanks of the radiator, supporting the casing, and, in turn, supported by side bars, usually of wood, to which the braces and the casing are rigidly clamped by a screw-threaded nut working on a bolt passing through the side bars and the flange of the brace and of the casing.

Heretofore, these brace bars or strips have each been formed from two pieces, provided with parallel opposing flanges, spot-welded together, which flanges support the flanges of the casing for the radiator, and are in turn supported by side bars, to which the brace bars together with the casing are secured and rigidly clamped by means of bolts passing through the side bars, the flanges of the braces and the casing being tightened by a nut screw-threaded on the bolt. The free ends of such braces are bent to conform to the opposing surfaces of the tanks to which they are secured by rivets or bolts passing through the brace bars and the walls of the tanks.

Brace bars for automobile radiators, when constructed and secured to and connecting the tanks, as above described, are subject to the objection that the vibrations of the running engine and the force from the jolts occurring to a traveling automobile are transmitted directly to the radiator and thereby constantly tend to not only open the joints between the tanks and the radiator tubes, but to loosen the joints between the brace bars, their support, and the casing clamped thereto, with the result that the tanks are rendered inefficient because of not infrequent leakage; that objectionable rattling sounds are produced by the radiator; that its durability is correspondingly reduced, and that the cost of construction and installation of brace bars in two pieces is greater than need be for securing better results.

Another object of my invention is to have a brace bar for automobile radiators so constructed that the force of vibrations of the engine for, and the traveling automobile transmitted to the radiator shall be substantially and materially reduced and to a minimum, and the durability of the radiator accordingly increased and its greatest efficiency constantly maintained.

With these ends in view, my invention finds embodiment in certain features of novelty in the construction, combination and arrangement of parts, by which said objects and certain other objects are attained, all as hereinafter described with reference to the accompanying drawings, and more particularly pointed out in the appended claims.

In said drawings,—

Fig. 1 is a side elevation of a brace for automobile radiators, in which my invention finds its embodiment.

Fig. 2 is a similar view with the brace shown in its operative position for connecting the tanks of the radiator.

Fig. 3 is a front elevation, partly in cross-section, showing the side bars for supporting the radiator.

Fig. 4 is a front elevation of the brace bar of my invention.

Fig. 5 is a side elevation of the radiator casing, and

Fig. 6 is a side elevation of the radiator with the casing removed.

Similar characters of reference indicate the same parts in the several figures of the drawings.

The brace bar of my invention finds its embodiment in a single bar 7, of bendable metal, of a width substantially that of the transverse diameter of the tanks 8 and 9 of the tube structure 10 of an automobile radiator, which strip is bent upon itself to form an outwardly projecting flange 11 adapted to be projected across and be supported upon side bars 13 or through base support, and, in turn, support the flange 14 of the casing 15 for a radiator, the opposing parallel faces of the flange being preferably, though not necessarily slightly but distinctly separated, as indicated at 12, in order to impart greater resiliency to the flange if and when desired for absorption of the force of vibrations otherwise imparted to the radiator.

The length of the brace bar 7 is sufficiently greater than that of the vertical sides of the radiator for its end to overlap in part the top and bottom tanks thereof, and for which purpose the lower end of the bar is provided with a bend 16, conforming to the contour of and adapted to partially overlap the opposing bottom surface of the lower tank 9, its upper end being also provided with a bend 17 conforming to the contour of and having overlapping contact with the upper surface of the top tank and opposed thereto.

The top tank 8 may, as heretofore, have brazed thereto, adjacent the bend 17, a bracket plate 18 which, in its operative position supports the inwardly projecting end 19 of the upper tank 8.

The form of the flange 11, by bending a single-piece brace bar upon itself, not only furnishes a support for the radiator in its entirety from the side bars 13, but provides a means by which the flange may be adapted to yield to and absorb the force of the vibrations of the engine and the automobile when running over rough roads, heretofore directly transmitted to the radiator, and objectionable for reasons before pointed out.

In other words, formed as are the brace bars of my invention from a single strip or bar of flexible iron or steel, a yielding cushion is located between the side bars 13 and the radiator, due to the resiliency of the metal from which the bars are formed, maintaining the space between the arms forming the flange 11, following the tightening of the bolt 13ᵃ sufficiently to connect the radiator with and in its operative position upon the side bars 13. To this it may be added that the resiliency of the arm of the U-shaped bend forming the flange for the braces tends to lock the nut against accidental movement in its tightened position upon the bolt.

In addition to the advantages attributable to the construction of a brace bar of my invention, as hereinbefore described, the provision is made by which sufficient solder may be introduced between the opposing surfaces of a brace bar and the tanks for maintaining their adherence thereto against accidental detachment.

To these ends, the bent ends 16 and 17 of the brace bars adjacent are respectively provided with slots 22 and 23 which, as shown in the drawing, are elongated and are located transversely of the bars, but which may be of any other form adapted to provide ducts through which a quantity of solder may be introduced between the opposing surfaces of the brace bar and the surface of the tanks, which, when sweated, will secure the brace bar and tanks in their operative position against accidental detachment, and without which it would be difficult, if not impractical, to do so.

Having described my invention, what I claim as new and desire to secure by Letters Patent is:

1. A brace bar for automobile radiators, consisting of a single bar bent upon itself to form a laterally supporting flange therefor, the ends of which bar are adapted to conform, overlap and be secured respectively to and connect the top and bottom tanks of a radiator.

2. A brace bar for automobile radiators, consisting of a single resilient bar adapted to embrace the vertical side of an automobile radiator and a portion of the outer surface of the top and bottom tanks therefor, provided with a laterally projecting flange bent therefrom and adapted to support in their entirety both the hood and radiator for an automobile.

3. A brace bar for automobile radiators, provided with a resiliently compressible flange integrally connected therewith intermediate the ends of the bar, adapted to project across the side bar supports for a radiator, said bar being provided with ducts through which solder may be introduced for securing the ends of the bar to the tanks of the radiators by means of a sweating process.

4. A brace for the vertical sides of an automobile radiator, consisting of a bar extending from the bottom to substantially the top of and embracing said sides, provided intermediate its ends with a yielding U-shaped flange projecting over and upon the base support for the radiator, and adapted to substantially reduce the force of vibrations from the engine and a traveling automobile transmitted to the radiator.

5. In a device of the kind described and in combination, a radiator, a frame, and a yieldable support for securing said radiator on the frame, said support comprising a strip folded upon itself to provide an open loop, means for fixedly securing each of the ends of said strip separately to the radiator, and means for detachably securing said strip at its looped end to said frame.

6. In a device of the character described, in combination, a radiator, a frame, and a member for securing said radiator on the frame, said member comprising a strip folded upon itself to provide a flange, means for fixedly securing each of the ends of said strip separately to the radiator, and means for securing said strip at its flange portion to said frame.

7. In a device of the character described, in combination, a radiator, a frame, and a member for securing said radiator on the frame, said member comprising a strip folded upon itself to provide a flange adapted to project over and upon the radiator frame, said strip extending above and below said flange to flatly engage and brace the entire vertical sides of said radiator, means for fixedly securing said strip to the radiator, and means for securing said strip at its flange portion to said frame.

8. A brace for the vertical sides of an automobile radiator, consisting of a substantially flat bar folded upon itself to provide a flange adapted to project over and upon the base support for the radiator, which bar is adapted to extend above and below said flange portion to directly engage and brace said radiator from the bottom to the top thereof.

In witness whereof, I have hereunto set my hand and affixed my seal, this 25th day of June, A. D. 1920.

MAX KRECHAFSKY. [L. S.]

Witnesses:
JNO. G. ELLIOTT,
H. SLACK.